United States Patent
Uetsuki

(10) Patent No.: US 10,578,776 B2
(45) Date of Patent: Mar. 3, 2020

(54) TOTAL INTERNAL REFLECTION PRISM FOR USE WITH DIGITAL MICROMIRROR DEVICES

(71) Applicant: CHRISTIE DIGITAL SYSTEMS USA, INC., Cypress, CA (US)

(72) Inventor: Kazumasa Uetsuki, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 15/594,694

(22) Filed: May 15, 2017

(65) Prior Publication Data

US 2018/0329116 A1 Nov. 15, 2018

(51) Int. Cl.
*G02B 1/115* (2015.01)
*G02B 5/04* (2006.01)
*G02B 26/08* (2006.01)

(52) U.S. Cl.
CPC ........... *G02B 1/115* (2013.01); *G02B 5/04* (2013.01); *G02B 26/0833* (2013.01)

(58) Field of Classification Search
CPC ...... G02B 1/115; G02B 5/04; G02B 26/0833; G02B 27/145; G02B 27/142; G02B 27/1013; G02B 27/12; G02B 27/126; G03B 21/008
USPC ........... 359/204.5, 207.7, 211.6, 217.4, 558, 359/601–614, 618, 629, 638–640, 669, 359/831–837; 353/81, 33, 34, 30–31, 70; 352/119
See application file for complete search history.

(56) References Cited

U.S. PATENT DOCUMENTS

| | | | |
|---|---|---|---|
| 6,959,990 B2 | 11/2005 | Penn | |
| 6,992,830 B1* | 1/2006 | Mitchell | G02B 27/1033 359/601 |
| 8,619,365 B2 | 12/2013 | Harris et al. | |
| 2006/0139757 A1 | 6/2006 | Harris et al. | |
| 2009/0067071 A1* | 3/2009 | Lin | B29D 11/0074 359/831 |
| 2012/0268720 A1* | 10/2012 | Wang | G02B 5/04 353/81 |
| 2015/0212237 A1* | 7/2015 | Su | G02B 1/115 359/581 |
| 2017/0285453 A1* | 10/2017 | Morant | G02B 5/04 |

* cited by examiner

*Primary Examiner* — William R Alexander
*Assistant Examiner* — Alberto J Betancourt
(74) *Attorney, Agent, or Firm* — Perry + Currier, Inc.

(57) ABSTRACT

A total internal reflection prism, for use with a digital micromirror device (DMD), is provided. The total internal reflection prism comprises: a DMD-facing side; an air gap internal to the TIR prism, the air gap including a total internal reflection (TIR) surface; and an anti-reflective (AR) coating at the TIR surface of the air gap, the AR coating one or more of: optimized for transmission of DMD off-state light through the air gap; and having higher transmission at a DMD off-state angle than at an angle where one or more of illumination light and DMD on-state light are transmitted through the air gap.

8 Claims, 6 Drawing Sheets

TOTAL INTERNAL REFLECTION PRISM FOR USE WITH DIGITAL MICROMIRROR DEVICES

FIELD

The specification relates generally to digital micromirror devices, and specifically to a total internal reflection prism for use with digital micromirror devices.

BACKGROUND

Total internal reflection (TIR) prisms are used with digital micromirror devices (DMDs) in projection systems to convey illumination light to the DMD, convey DMD on-state light towards projection optics, and convey DMD off-state light away from projection optics, for example to a light dump. However, the TIR surface of the TIR prism generally reflects at least a portion of the DMD off-state light back towards the DMD which decreases in projected images contrast due to both light scattering and a tendency of the DMD to convert at least some of the back-reflected DMD off-state light into higher order components of the DMD on-state light due to diffraction effects of the DMDs. Use of anti-reflective coatings at the TIR surface are generally optimized for transmission of the DMD on-state light therethrough, which exacerbates the problem. While AR coatings optimized for transmission of off-state light have been used at the DMD window, this can also exacerbate the problem as it increases the transmission of back reflected DMD off-state light from the TIR surface to the DMD.

SUMMARY

In general, this disclosure is directed to a total internal reflection (TIR) prism with an air gap internal to the TIR prism, the air gap including a total internal reflection (TIR) surface, and an anti-reflective (AR) coating at the TIR surface of the air gap, the AR coating one or more of: optimized for transmission of DMD off-state light through the air gap; and having lower reflectance and/or higher transmission at a DMD off-state angle than at an angle where one or more of illumination light and DMD on-state light are transmitted through the air gap. This reduces the back-reflection of the DMD off-state light, as compared to TIR prisms with AR coatings optimized for transmission of DMD on-state light and/or illumination light. Whether the DMD on-state light or the illumination light is transmitted through the TIR surface depends on how the illumination light is received. Regardless, such a reduction has the overall effect of increasing contrast ratio in projected images. While the transmission of the on-state light or the illumination light is decreased, and hence the overall system efficiency (e.g. light throughput) is reduced (e.g. as compared to TIR prisms with AR coatings optimized for transmission of DMD on-state light, or illumination light), such reductions are small as compared to increases in contrast ratio. In further implementations, the AR coating at the TIR surface is optimized taking into account transmission of DMD off-state light, as well as the transmission of the DMD on-state light, or the illumination light, for example to produce a flat AR response at the respective angles of the off-state light and the on-state light, or the illumination light.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

An aspect of the specification provides a total internal reflection (TIR) prism, for use with a digital micromirror device (DMD), the total internal reflection prism comprising: a DMD-facing side; an air gap internal to the TIR prism, the air gap including a total internal reflection (TIR) surface; and an anti-reflective (AR) coating at the TIR surface of the air gap, the AR coating one or more of: optimized for transmission of DMD off-state light through the air gap; and having higher transmission at a DMD off-state angle than at an angle where one or more of illumination light and DMD on-state light are transmitted through the air gap.

In some implementations, each of the facing surfaces of the air gap, including the TIR surface, are coated with at the AR coating.

In some implementations, the total internal reflection prism further comprises a second AR coating at the DMD-facing side, the second AR coating optimized for transmission of the DMD off-state light therethrough rather than the DMD on-state light.

In some implementations, the DMD-facing side receives the DMD on-state light at a first respective angle, and the DMD-facing side receives the DMD off-state light at a second respective angle, the total internal reflection prism further comprising a second AR coating at the DMD-facing side having higher transmission at the second respective angle than the first respective angle.

In some implementations, the total internal reflection prism further comprises a common light-exit side, and a second AR coating at the common light-exit side, the second AR coating optimized for transmission of the DMD off-state light therethrough rather than the DMD on-state light.

In some implementations, the total internal reflection prism further comprises a common light-exit side wherein the common light-exit side receives the DMD on-state light at a first respective angle, and the common light-exit side receives the DMD off-state light at a second respective angle, the total internal reflection prism further comprising a second AR coating at the common light-exit side having higher transmission at the second respective angle than the first respective angle.

In some implementations, the AR coating comprises between six and sixteen layers of optical materials, inclusive.

In some implementations, the TIR surface is configured to: reflect the illumination light out through the DMD-facing side; and transmit the DMD on-state light at the angle through the air gap.

In some implementations, the TIR surface is configured to: transmit the illumination light at the angle through the air gap and out through the DMD-facing side; and reflect the DMD on-state light out of a DMD on-state light exit side.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
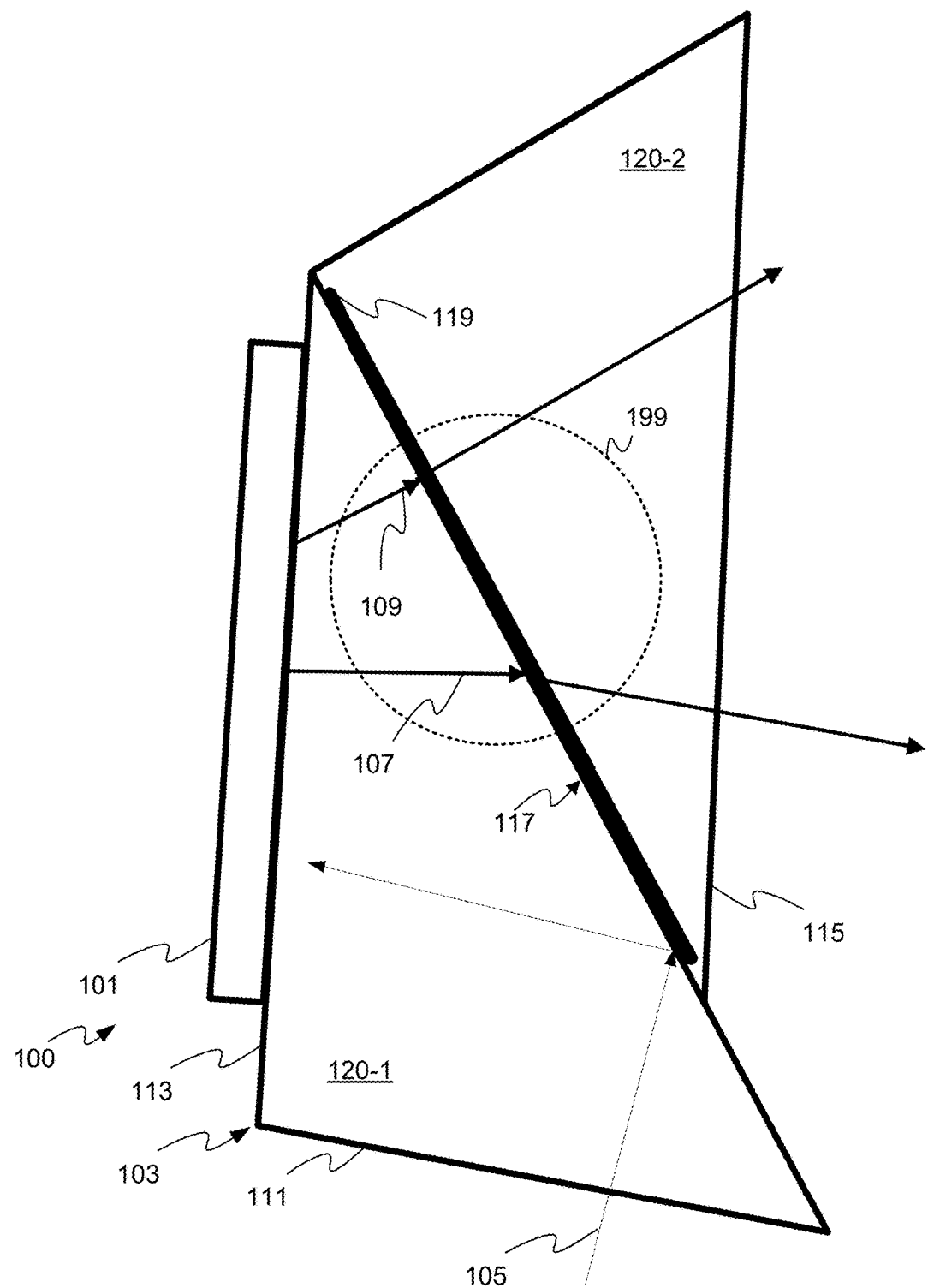
FIG. 1 depicts a projection system that includes a digital micromirror/total internal reflection prism, according to non-limiting implementations.

FIG. 1 depicts a schematic side view of a projection system 100 that includes a digital micromirror device (DMD) 101 and a total internal reflection (TIR) prism 103. While the DMD 101 and the TIR prism 103 are depicted schematically, each generally have a three-dimensional structure compatible with a size of images being produced by the DMD 101 for projection.

The DMD 101 generally comprises an array of micromirrors (not depicted) that are controlled between an on-state and off-state such that illumination light 105 (e.g. from a light source, not depicted) illuminating the DMD 101 is formed into images. In particular, the DMD 101 reflects DMD on-state light 107 (for example, from micromirrors in an on-state position) and DMD off-state light 109 (for example, from micromirrors in an off-state position) at different angles; the DMD on-state light 107 has generally been modulated into an image to be projected, while the DMD off-state light 109 is generally discarded, for example via conveyance to a light dump.

The TIR prism 103 is generally for use with the DMD 101 and located adjacent the DMD 101. The TIR prism 103 is generally configured to: convey the illumination light 105 to the DMD 101 for modulation; convey the DMD on-state light 107 towards projection optics (not depicted); and convey the DMD off-state light 109 towards, for example, a light dump (not depicted), and the like, and/or away from the projection optics.

Specifically, the TIR prism 103 comprises: a surface 111 which, as depicted, receives the illumination light 105; a DMD-facing side 113; a light-exit surface 115 through which at least the DMD off-state light 109 exits as well as, as depicted, the DMD on-state light 107; a total internal reflection (TIR) surface 117, between the DMD-facing side 113 and the light-exit surface 115, configured to: reflect illumination light 105, received through the illumination-light-receiving surface 111, out through the DMD-facing side 113; transmit DMD on-state light 107, received through the DMD-facing side 113 out through the light-exit surface 115; and transmit DMD off-state light 109, received through the DMD-facing side 113 out through the light-exit surface 115; and an anti-reflective (AR) coating 119 at the TIR surface 117. As will be explained in further detail below, the TIR prism 103 includes an air gap internal to the TIR prism 103, the air gap including the TIR surface 117.

For clarity, the AR coating 119 is depicted as being only on a portion of the TIR surface 117. Furthermore, as depicted, and explained in further detail below the TIR surface 117 is formed from an air gap between two smaller prisms 120-1, 120-1 (e.g. the TIR prism 103 comprises prisms 120-1, 120-2), and hence the AR coating 119 is formed on at least the TIR surface 117 of the air gap between the surfaces of the prisms 120-1, 120-2 using, for example, optical coating techniques and the like.

In particular, the TIR prism 103 and a light source and/or light source optics (not depicted), are arranged such that the illumination light 105 enters the illumination-light-receiving surface 111, and reflects from the TIR surface 117 out through the DMD-facing side 113 to illuminate the DMD 101. Hence, it is assumed that the TIR surface 117 is at a total internal reflection angle relative to the illumination light 105.

Mirrors of the DMD 101 in the on-state position reflect the illumination light 105 as the DMD on-state light 107, the DMD on-state light 107 being transmitted through the DMD-facing side 113 of the TIR prism 103, as well as through the TIR surface 117, and through the light-exit surface 115 of the TIR prism 103. Similarly, mirrors of the DMD 101 in the off-state position reflect the illumination light 105 as the DMD off-state light 109, the DMD off-state light 109 being transmitted through the DMD-facing side 113 of the TIR prism 103, as well as through the TIR surface 117, and through the light-exit surface 115 of the TIR prism 103. As the mirrors in the on-state positions and the off-state positions are at different angles, the DMD on-state light 107 and the DMD off-state light 109 are reflected through the TIR prism 103 at different angles.

As will be further explained below with reference to FIG. 5, in some implementations paths of the illumination light and the DMD on-state light are reversed. In other words, the illumination light can be received along the depicted path of the DMD on-state light 107 (though opposite in direction), at the surface 115 of the TIR prism 103, and is transmitted by the TIR surface 117 out the DMD-facing side 113; and the DMD on-state light, in these implementations, is received through the DMD-facing side 113 along the depicted path of the illumination light 105 (though opposite in direction), the DMD on-state light, in these implementations, being reflected by the TIR surface 117 out through the surface 111.

Figure 2:
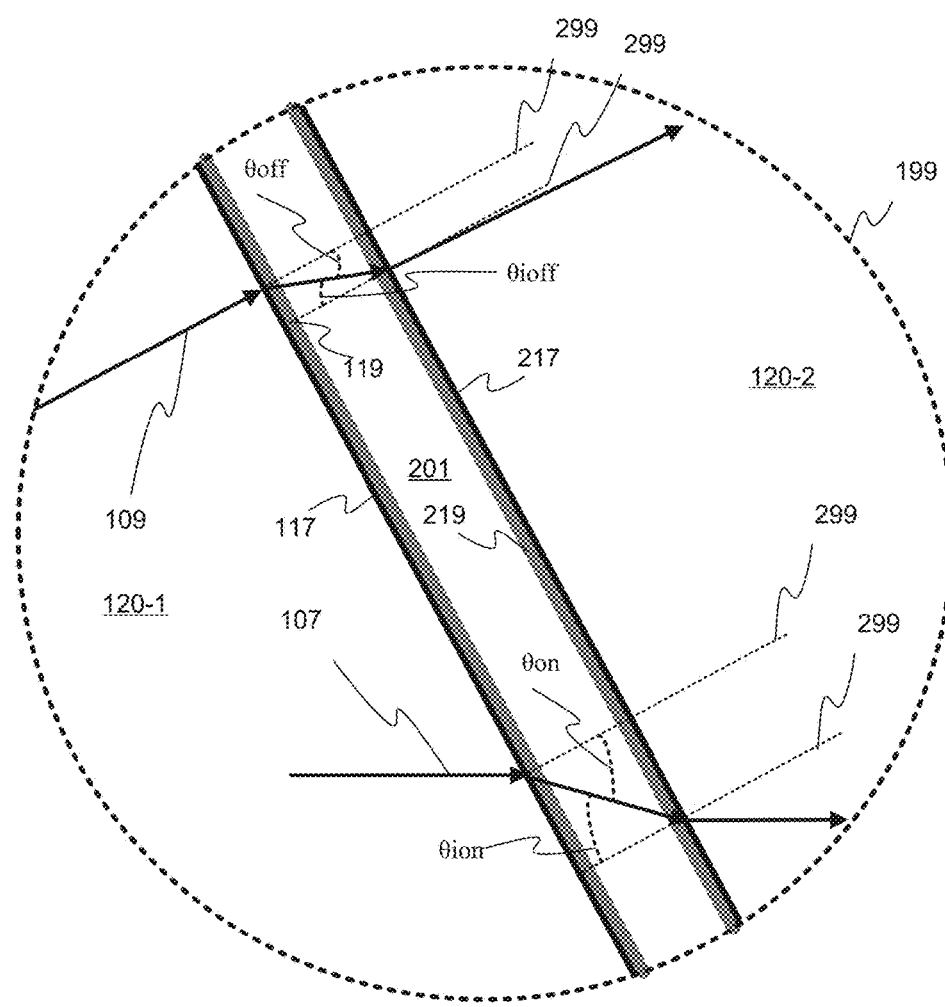
FIG. 2 depicts details of an air gap of the total internal reflection prism of FIG. 1, according to non-limiting implementations.

Attention is next directed to FIG. 2 which depicts a detailed view of the region 199 of FIG. 1, and in particular details of an air gap 201 of the TIR prism 103. As is clear from FIG. 2, the air gap 201 is between the two prisms 120-1, 120-2, and the TIR surface 117 is one of two facing surfaces 117, 217 of the air gap 201. Furthermore, as depicted, each of the facing surface 117, 217 has a respective AR coating 119, 219 thereupon. In other words, the AR coating 119 is at the TIR surface 117, while the AR coating 219 is at the facing surface 217. Each of the AR coatings 119, 219 has a similar and/or the same reflectance curve, as described below with reference to FIG. 4. At least the AR coating 119 is present at the TIR prism 103, however, in some implementations, each of the facing surfaces 117, 217 is coated with a respective AR coating 119, 219 by, for example, coating respective surfaces of prisms 120-1, 120-2 prior to assembling the TIR prism 103.

As depicted, the DMD on-state light 107 is diffracted at an angle θon by the TIR surface 117, as defined with respect to a normal 299 to the TIR surface 117, while the DMD off-state light 109 is diffracted at an angle θoff at an angle θoff, as also defined with respect to a normal 299 to the TIR surface 117.

A respective angle of impingement of each of the DMD on-state light 107 and the DMD off-state light 109 onto the TIR surface 117 is less than a TIR angle, hence each of the DMD on-state light 107 and the DMD off-state light 109 are generally transmitted through the TIR surface 117 from the prism 120-2, across the air gap 201, impinging on the facing surface 217 (and the AR coating 219, and diffracted into prism 120-1 and continuing as depicted in FIG. 1. Furthermore, while not depicted, a portion of each of the DMD on-state light 107 and the DMD off-state light 109 is reflected back towards the DMD-facing side 113, by each of the surfaces 117, 217.

As depicted, each of the angles θon, θoff are measured from the normal 299 of the TIR surface 117 on an air side of the TIR surface 117 and/or in the air gap 201. The angle θon is about 45°. The size of the angle θoff is exaggerated in FIG. 2 and is about 0°. Furthermore, a respective impingement angle θion, θioff of each of the DMD on-state light 107 and the DMD off-state light 109 onto the facing surface 217 is the same as the respective angles θon, θoff (i.e. angle θion=angle θon, and angle θioff=angle θoff). However, each of the angles θon, θoff (and the angles θion, θioff) respectively depends on the angles of the micromirrors in the on-state position and the off-state position (as well as the incident angle of the illumination light 105 and the TIR angle relative of the TIR surface 117 relative to the illumination light 105), and hence other angles θon, θoff are within the scope of present implementations. For example, for many DMD/TIR systems, the angle θoff is between about 0° and about 15° (e.g. 0°<θoff<15°), while the angle θon is between about 30° and about 60° (e.g. 30°<θon<60°).

In prior art DMD/TIR prism systems, an AR coating at a TIR surface of a TIR prism is optimized for transmission of DMD on-state light therethrough in order to maximize efficiency of the DMD on-state light through the prior art prisms. Such systems can be similar to the system 100, but with the AR coating optimized for transmission of the DMD on-state light, which can be define according to the angle θon. For example, attention is next directed to FIG. 3 which depicts angular reflectance curves of a prior art AR coating at three different wavelengths, 455 nm (e.g. blue light), 520 nm (e.g. green light) and 638 nm (e.g. red light). In other words, it is assumed that the prior art DMD is a component of a one-DMD projector, and the illumination light is cycled through blue light, green light and red light, with the DMD modulated accordingly to form blue images, green images and red images projected by the projection optics to form a full colour image. The angular reflectance curves depict reflection of the AR coating from the air gap side.

Assuming that the angle θoff is at about 0° and the angle θon is at about 45° (e.g. similar to system 100), from FIG. 1 and FIG. 2 it is understood that at most wavelengths, the AR coating is optimized for minimum reflectance (e.g. maximum transmission) at an angle around the angle θon. For example, at the angle θon the reflectance is smaller and/or the transmission is larger for the wavelengths 520 nm, 638 nm (e.g. green light and red light) than at the angle θoff, and/or the reflectance at the angle θoff is substantially greater than "0" (and/or the transmission at the angle θoff is substantially less than "100". Hence, at these wavelengths, at the angle θoff, there will be a substantial back reflectance of the DMD off-light back towards the DMD.

Due the diffractive nature of micromirror arrays, not only will some of the DMD off-light be scattered into the path of image off-pixels in the image formed by the DMD on-light, but the DMD off-light will also contribute to the intensity of images formed by the DMD on-light, leading to reduced contrast of projected images formed from the DMD on-light. While, as depicted, these effects are reduced at the wavelength 520 and 638 nm (e.g. as the reflectance at each angle θon, θoff is similar for the green and red light), the overall contrast is reduced as projected images are formed from the combination of the red light, green light and blue light.

However, in contrast to the prior art systems, the AR coating 119 at the TIR surface 117 is optimized for transmission of the DMD off-state light 109 therethrough to reduce the scattering and/or back reflection of the DMD off-state light 109 from the TIR surface 117 back towards the DMD-facing side 113 and/or the DMD 101. For example, at least the TIR surface 117 is coated with the AR coating 119 and preferably the facing surface 217 is also coated with the AR coating 219.

Figure 3:
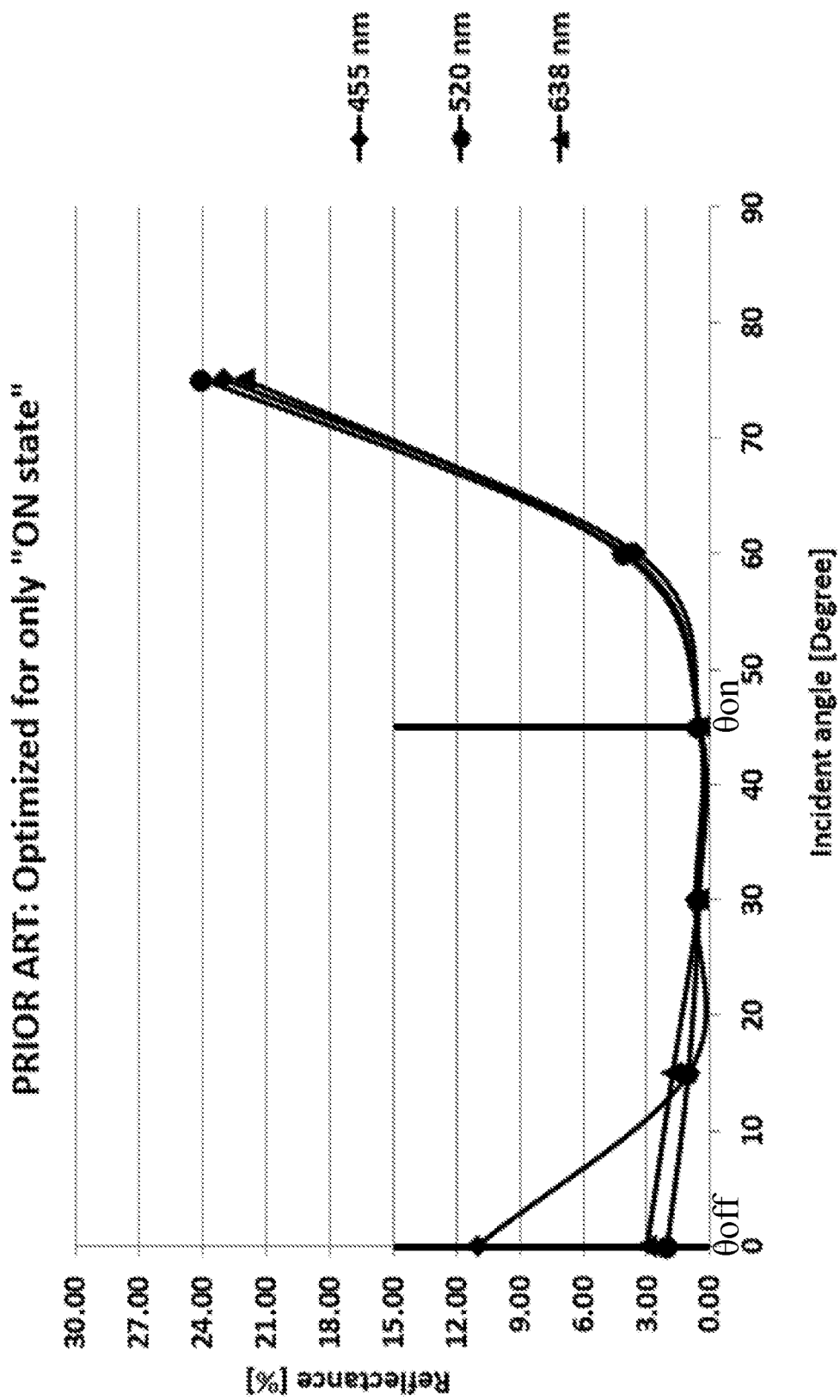
FIG. 3 depicts angular reflectance curves of an anti-reflective coating at a total internal reflection surface of a prior art total internal reflection prism.
Figure 4:
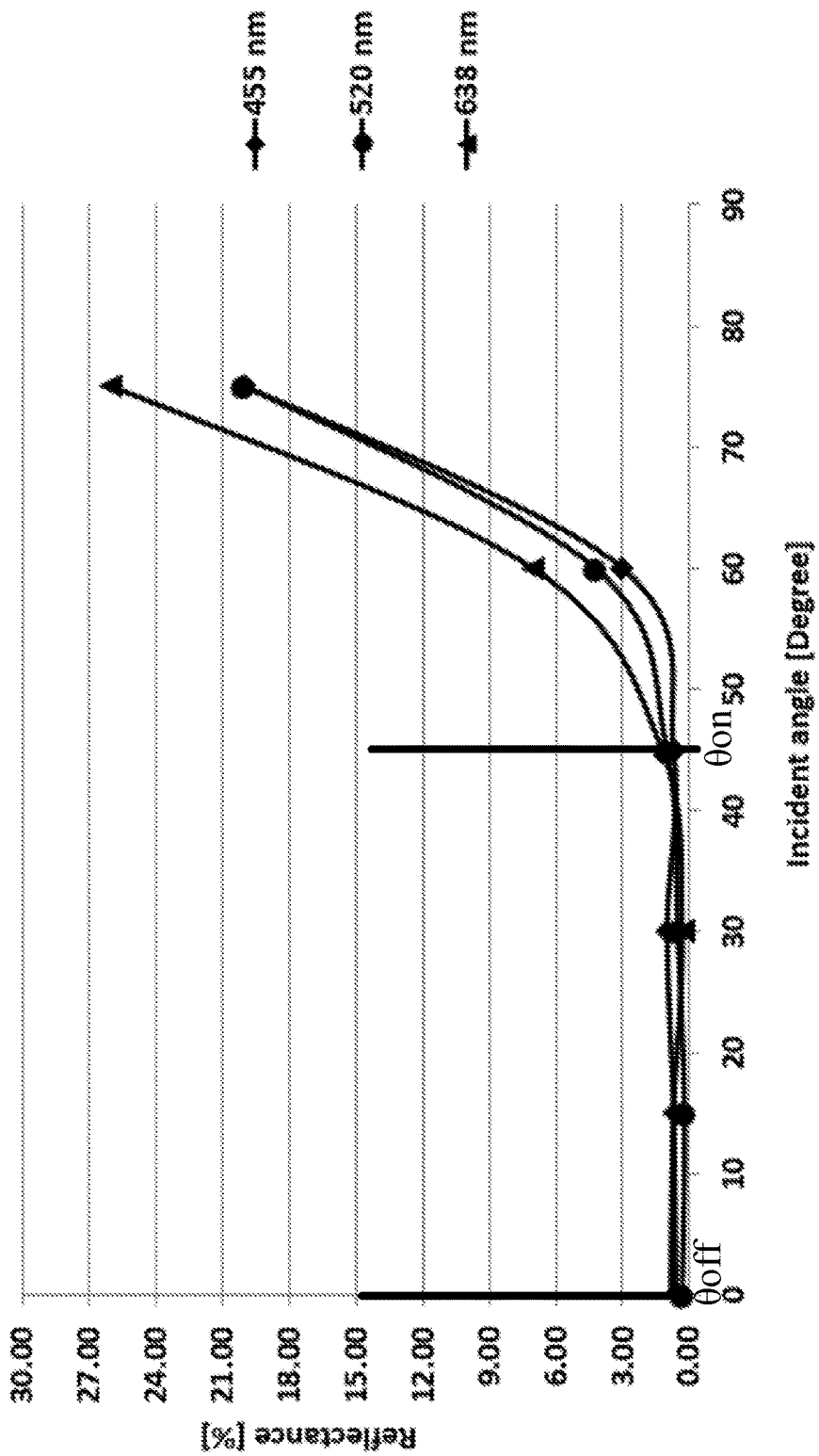
FIG. 4 depicts angular reflectance curves of an anti-reflective coating at a total internal reflection surface of the total internal reflection prism of FIG. 1, according to non-limiting implementations.

Attention is next directed to FIG. 4 which depicts angular reflectance curves of an example AR coating 119, 219 at three different example wavelengths, 455 nm (e.g. blue light), 520 nm (e.g. green light) and 638 nm (e.g. red light). While performance of the AR coatings 119, 219, and other AR coating described herein, are described with respect to specific example wavelengths, it is appreciated that devices and techniques described herein can be applied to any wavelengths used with DMDs. In any event, again, assuming that the angle θoff is at about 0° and the angle θon is at about 45°, from FIG. 4 it is understood that at all three wavelengths, 455 nm, 520 nm and 638 nm the AR coatings 119, 219 is optimized for minimum reflectance and/or maximum transmission around the angle θoff. For example, at the angle θoff the reflectance is smaller and/or the transmission is larger for all the wavelengths 455 nm, 520 nm and 638 nm than at the angle θon. Hence, at these wavelengths, at the angle θoff, back reflectance of the DMD off-light 109 back towards the DMD 101 is reduced as compared to the AR coating depicted in FIG. 3. While back reflectance of the DMD on-light 107 is increased, as compared to the AR coating depicted in FIG. 3, which also reduces the efficiency (e.g. transmission) of the DMD on-light 107, as compared to the AR coating depicted in FIG. 3, the AR coatings 119, 219 lead to an overall increase in on contrast of the system 100.

In particular, contrast ratio and system efficiency of the system 100 that includes the AR coatings 119, 219 having reflectance depicted in FIG. 4 was modeled, assuming that the system 100 is component of a one-DMD projector where: the DMD 101 comprises a WQXGA DMD; the illumination light 105 comprises red, green and blue light having an f-number of F/4; and the projection optics used to project an image corresponding to the DMD on-light 107 comprises two ideal projection lenses having f-numbers of F/2.5. Modeling was also performed for contrast ratio and system efficiency of a similar system that includes the AR coating having reflectance depicted in FIG. 3. Contrast ratio is generally defined as a ratio of a brightness (e.g. in lumens, nits and the like) of white pixels to black pixels, while the system efficiency is generally defined as a percentage of white light that is not lost (e.g. for one white pixel) as the illumination light 105 is modulated by the DMD 101, passes through the TIR prism 103, and the transmitted light is captured by projection optics (not depicted)

The results of the modeling are summarized in Table 1, hereafter:

TABLE 1

| TIR Surface Reflectance | Reflectance Optimized at 0° (FIG. 4) | Reflectance Optimized at 45° (FIG. 3) |
| --- | --- | --- |
| Contrast Ratio | 7215:1 | 1354:1 |
| System Efficiency | 60.7% | 61.3% |

From Table 1, it is apparent that when the AR coatings 119, 219 having reflectance depicted in FIG. 4 is used in place of the AR coatings having reflectance depicted in FIG. 3, the contrast ratio increases by about 5× (e.g. 7215:1 compared to 1354:1), and the system efficiency is reduced by only about 1% (e.g. 60.7% compared to 61.3%).

Hence, while the system efficiency decreases (e.g. when the AR coatings of FIG. 3 is replaced with the AR coatings of FIG. 4), the loss is small as compared to the increase in contrast ratio.

Furthermore, while the angular reflectance curves of each of the AR coatings 119, 219 as depicted in FIG. 4 were optimized to maximize transmission of DMD off-state light therethrough, each of the AR coatings 119, 219 as depicted in FIG. 4 were further optimized to flatten the response of the AR coatings 119, 219 from the angle θoff to the angle θon, to attempt to also minimize the back reflectance of the DMD on-state light. Indeed, the flatness of the angular reflectance curves depends on a number of layers in the AR coatings 119, 219, materials etc.

For example, with reference to FIG. 4, the AR coatings 119, 219 having the angular reflectance curves of FIG. 3 were formed from six layers of optical materials and based on a combination of higher refractive index materials and lower refractive index materials. In particular, non-limiting example implementations, $TiO_2$ was selected as the higher refractive index material, and $SiO_2$ was selected as the lower refractive index material. Furthermore, the materials for the prisms 120-1, 120-2 was N-BK7. The relative thickness of each layer of the example AR coatings 119, 219 was 0.25H 0.26L 8.81H 0.11L 0.48H 0.90L, where H and L represent the higher index material and the lower index material respectively, and numerical values represent the layer thicknesses in the quarter-wave notion of 532 nm. However, other combinations of materials and thickness of the materials are within the scope of present implementations including, but not limited to suitable combination of oxides, nitrides and the like. Indeed, such parameters of AR coatings of the present specification can be determined using optical modelling techniques which attempt to optimize transmission and/or reflectance at the angle θoff at all wavelengths to be used with the AR coatings, and further attempt to reduce the reflectance (and/or increase the transmission) at the angle θon at these wavelengths. Indeed, a flat response from the angle θoff to angles larger than the angle θon can be used as target reflectances, with the reflectance at the angle θoff generally being minimized and/or smaller than the reflectance at the angle θon. In general, to achieve such flatness (e.g. to reduce the angular dependence of reflectance of an AR coating), a number of layer between six and sixteen layers (inclusive) of optical materials for the AR coating can be used, however the number of layers depends on the materials used, and their respective indices of refraction and/or optical properties.

The effect of increasing contrast ratio can further be increased when two DMDs are used in a two-DMD projector with the two DMDs arranged in a cascade configuration. For example, attention is next directed to FIG. 5 which schematically depicts a cascade projection system 500, which comprises the DMD 101, the TIR prism 103, a second DMD 501; and a second TIR prism 503. However, in the system 500, illumination light 505 follows the revere path as the DMD-on state light 107 as depicted in FIG. 1, and also in the system 500, the DMD on-state light 507 follows the reverse path of the illumination light 105 as depicted in FIG. 1. The DMD off-state light 509 follows a similar path as the DMD off-state light 109 in FIG. 1. Hence, in the system 500, the TIR surface 117 transmits the illumination light 505 at an angle (e.g. the angle θon) through the air gap 201 and out through the DMD-facing side 113; and reflects the DMD on-state light 507 out of the surface 111 (e.g. a DMD on-state light exit side).

Figure 5:
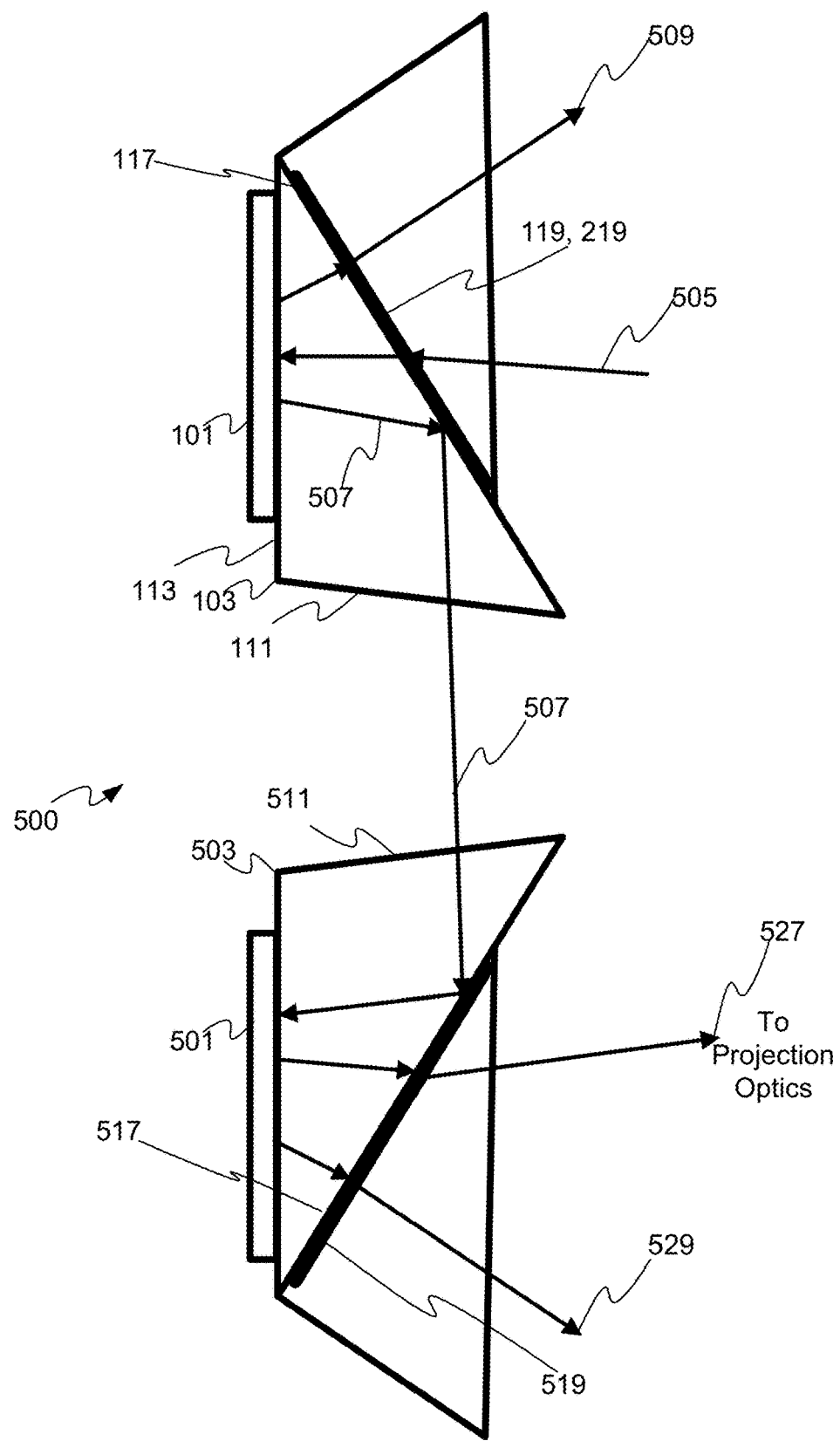
FIG. 5 depicts a cascade projection system, according to alternative non-limiting implementations.

Hence, comparing FIG. 5 and FIG. 1 it is apparent that the AR coating 119 (as well as the AR coating 219) at the TIR surface 117 of the air gap 201 is one or more of: optimized for transmission of DMD off-state light through the air gap 201; and has a higher transmission at a DMD off-state angle than at an angle where one or more of illumination light and DMD on-state light are transmitted through the air gap 201.

In the system 500, the TIR prism 503 is arranged relative to the TIR prism 103 such that the DMD on-state light 507 from the DMD 101 and TIR prism 103, is received through the surface 511. Indeed, as the TIR prism 503 is similar to the TIR prism 103, the surface 511 corresponds to the surface 111 of the TIR prism 103. Hence, DMD on-state light 507 follows a path through the TIR prism 503 that is similar to the path of the illumination light 105 in FIG. 1. Hence, the DMD on-state light 507 is reflected by a TIR surface 517 of the TIR prism 503 and is used to illuminate the second DMD 501, used in combination with the TIR prism 503. As the TIR prism 503 is similar to the TIR prism 103, the TIR prism 503 includes an anti-reflective (AR) coating 519 at the TIR surface 517, e.g. of a corresponding air gap (not depicted but assumed to present and similar to the air gap 201). Indeed, it is further assumed that each of the facing sides of the air gap of the TIR prism 503 includes an AR coating 519 similar to the AR coatings 119, 219.

In any event, similar to FIG. 1, the DMD on-state light 507 from the TIR prism 103 illuminates the DMD 501, and DMD on-state light 527 from the DMD 501 is conveyed out the TIR prism 503, for example to projection optics, and DMD off-state light 529 from the DMD 501 is conveyed out the TIR prism 503, for example to a light dump. Furthermore, the AR coating(s) 519 has a similar angular reflectance curve to the to the AR coatings 119, 219 and hence the back-reflections from the and DMD off-state light 529 is again reduced as compared to prior art devices.

Not all components of the system 500 are depicted, for example, optics between the TIR prisms 103, 503 and the like. Furthermore, while not all reference numbers for depicted components of the system 500 are provided, such components are nonetheless assumed to be present (e.g. the various light entrance and light exit sides of the TIR prisms 103, 503).

Hence, the DMD 501/TIR prism 503 combination is otherwise similar to the DMD 101/TIR prism 103 with, however, the DMD 501/TIR prism 503 combination is positioned so that the DMD on-state light 507 from the DMD 101/TIR prism 103 combination is used as illumination light for the DMD 501/TIR prism 503 combination. For example, in such systems, images to be projected are first formed by the DMD 101 (e.g. by the DMD on-state light 507), and used to illuminate the DMD 501, which forms similar images (e.g. only mirrors corresponding to "on" pixels of the DMD 501 are illuminated by the images formed by the modulated the DMD on-state light 507), resulting in an overall contrast increase, but a decrease in system efficiency.

Again, in the system 500, the AR coating(s) 519 at the TIR surface 517 of the TIR prism 503 is also optimized for transmission therethrough of DMD off-state light 529 from the DMD 501 rather than the DMD on-state light 527 from the DMD 501. In other words, the AR coating 519 has a similar reflectance vs incident angle response as that depicted in FIG. 4. Optical modeling of the system 500 was performed on this basis, similar to that described above and using similar parameters, to determine contrast ratio and system efficiency. The results of the modeling are summarized in Table 2, hereafter:

TABLE 2

| TIR Surface Reflectance | Reflectance Optimized at 0° (FIG. 4) | Reflectance Optimized at 45° (FIG. 3) |
| --- | --- | --- |
| Contrast Ratio | 163,000,000:1 | 3,090,000:1 |
| System Efficiency | 32.0% | 32.5% |

From Table 2, it is apparent that the contrast ratio increases by about 53× (e.g. 163,000,000:1 compared to 3,090,000:1), and the system efficiency is reduced by only about 0.5% (e.g. 32.0% compared to 32.5%) when the AR coating 519 having reflectance depicted in FIG. 4 is used in place of the AR coating having reflectance depicted in FIG. 3. In other words, in a cascade configuration, the system contrast is the synergistic contrasts of the first DMD/TIR prism and the second DMD/TIR prism, hence the system contrast is improved by about 53 times with the use of AR coatings 119, 219, 519 each having reflectance depicted in FIG. 4, in place of the AR coatings having reflectance depicted in FIG. 3.

Figure 6:
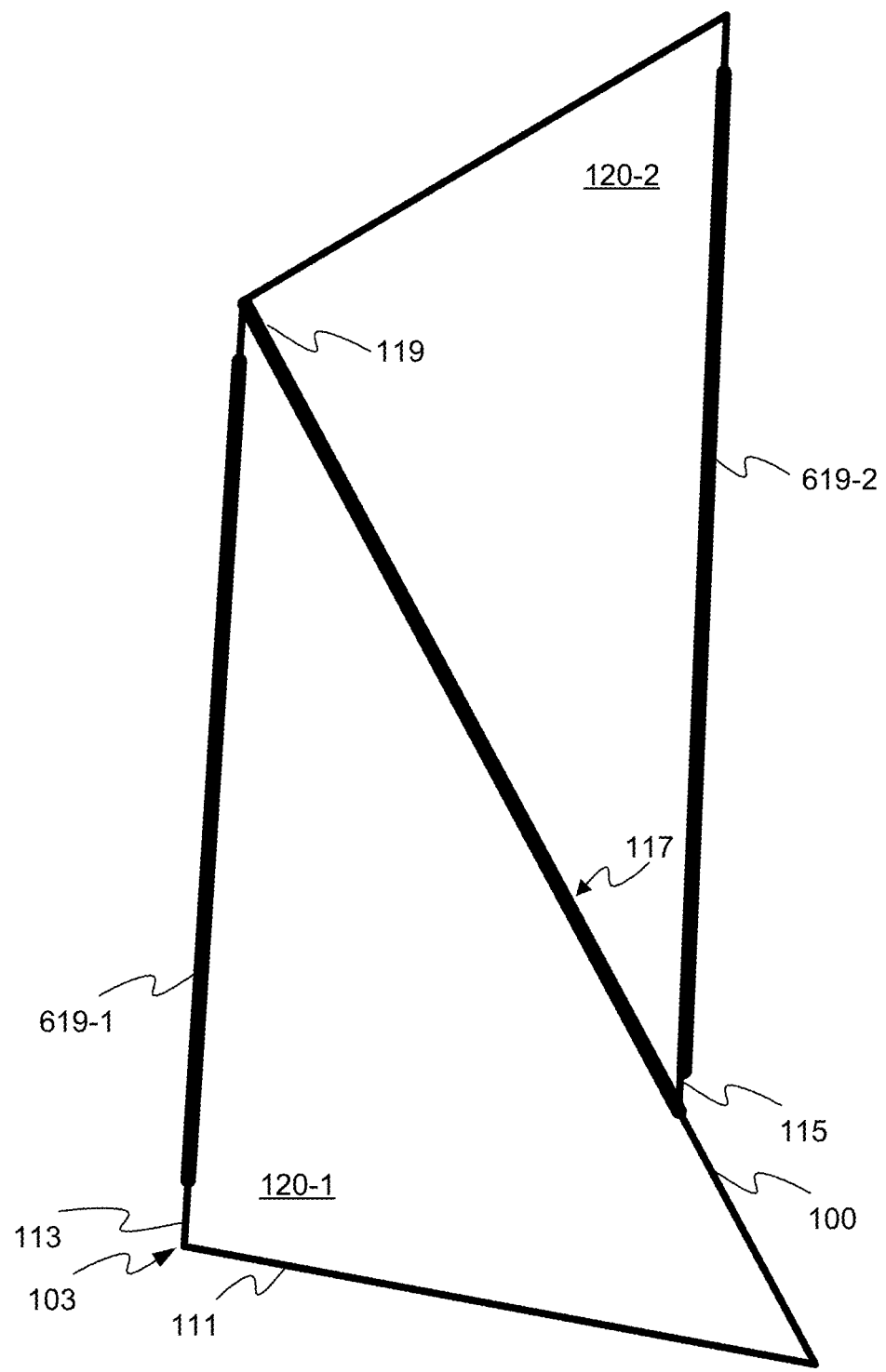
FIG. 6 depicts a total internal reflection prism, according to alternative non-limiting implementations.

Persons skilled in the art will appreciate that there are yet more alternative implementations and modifications possible. For example, attention is next directed to FIG. 6 which depicts the TIR prism 103 with, however optional AR coatings 619-1, 619-2 on, respectively, the DMD-facing side 113 and the light-exit surface 115. In particular, the optional AR coating 619-1 at the DMD-facing side 113 is optimized for transmission of the DMD off-state light therethrough rather than the DMD on-state light (e.g. as received at the DMD-facing side 113 from the DMD 101 (not depicted, but assumed to be positioned relative the TIR prism 103 as in FIG. 1)). In other words, the DMD-facing side 113 receives the DMD on-state light at a first respective angle (e.g. an incident angle), and the DMD-facing side 113 receives the DMD off-state light at a second respective angle (e.g. incident angle), and the total internal reflection prism 103 further comprises, in some implementations, a second AR coating 619-1 at the DMD-facing side 113 having higher transmission at the second respective angle than the first respective angle, similar to the reflectance curves depicted in FIG. 4, but optimized for transmission of the incident angle of the DMD off-state light received at the DMD-facing side 113 from the DMD 101.

Similarly, the optional AR coating 619-2 at the light-exit surface 115 is optimized for transmission of the DMD off-state light therethrough rather than the DMD on-state light (e.g. as received at the light-exit surface 115 from the TIR surface 117, as depicted in FIG. 1) and/or transmission of illumination light therethrough (e.g. as depicted in FIG.

5). In other words, the light-exit surface 115 receives the DMD on-state light at a first respective angle (e.g. an incident angle) (or the illumination light), and the light-exit surface 115 receives the DMD off-state light at a second respective angle (e.g. an incident angle), the total internal reflection prism 103 further comprises, in some implementations, a second AR coating 619-2 at the light-exit surface 115 having higher transmission at the second respective angle than the first respective angle, similar to the reflectance curves depicted in FIG. 4, and/or the second AR coating 619-2 is optimized for transmission of the DMD off-state light therethrough received at the light-exit surface 115 from the TIR surface 117.

However, each of the AR coatings 619-1, 619-2 is optional and the TIR prism 103 can comprise none, one or both of the AR coatings 619-1, 619-2.

In any event, described herein is a TIR prism having an AR coating at a TIR surface optimized for transmission of DMD off-state light, which increases contrast ratio of projected images as compared to TIR prisms having an AR coating at a TIR surface optimized for transmission of DMD on-state light.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A total internal reflection (TIR) prism, for use with a digital micromirror device (DMD), the total internal reflection prism comprising:
   a DMD-facing side;
   an air gap internal to the TIR prism, the air gap including two total internal reflection (TIR) surfaces facing each other; and
   respective anti-reflective (AR) coatings at each of the two TIR surfaces of the air gap, the respective AR coatings extending along respective regions of each of the two TIR surfaces of the air gap along which both DMD off-state light and DMD on-state light is transmitted, the respective AR coatings each optimized for transmission of the DMD off-state light through the air gap such the respective AR coatings have higher transmission at a DMD off-state angle than at a DMD on-state angle where DMD on-state light is transmitted through the air gap, each of the respective AR coatings having a similar reflectance curve and a similar transmission curve.

2. The total internal reflection prism of claim 1, further comprising a second AR coating at the DMD-facing side, the second AR coating having higher transmission of the DMD off-state light therethrough than the DMD on-state light.

3. The total internal reflection prism of claim 1, wherein the DMD-facing side receives the DMD on-state light at a first respective angle, and the DMD-facing side receives the DMD off-state light at a second respective angle, the total internal reflection prism further comprising a second AR coating at the DMD-facing side having higher transmission at the second respective angle than the first respective angle.

4. The total internal reflection prism of claim 1, further comprising a common light-exit side, and a third AR coating at the common light-exit side, the third AR coating having higher transmission of the DMD off-state light therethrough than the DMD on-state light.

5. The total internal reflection prism of claim 1, further comprising a common light-exit side wherein the common light-exit side receives the DMD on-state light at a first respective angle, and the common light-exit side receives the DMD off-state light at a second respective angle, the total internal reflection prism further comprising a third AR coating at the common light-exit side having higher transmission at the second respective angle than the first respective angle.

6. The total internal reflection prism of claim 1, wherein the respective AR coatings each comprise between six and sixteen layers of optical materials, inclusive.

7. The total internal reflection prism of claim 1, wherein the TIR surface is configured to: reflect the illumination light out through the DMD-facing side; and transmit the DMD on-state light at the angle through the air gap.

8. The total internal reflection prism of claim 1, wherein reflectance of each of the respective AR coatings is smaller at the DMD off-state angle than at a DMD on-state angle.

* * * * *